US010024648B2

(12) United States Patent
Nagahama et al.

(10) Patent No.: US 10,024,648 B2
(45) Date of Patent: Jul. 17, 2018

(54) INTERFERENCE MEASURING DEVICE AND METHOD OF MEASUREMENT USING THE SAME DEVICE

(71) Applicant: Mitutoyo Corporation, Kawasaki, Kanagawa (JP)

(72) Inventors: Tatsuya Nagahama, Kanagawa (JP); Ken Motohashi, KP Eindhoven (NL); Han Haitjema, KP Eindhoven (NL); Johannes Anna Quaedackers, Veldhoven (NL)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 15/622,996

(22) Filed: Jun. 14, 2017

(65) Prior Publication Data
US 2017/0363411 A1    Dec. 21, 2017

(30) Foreign Application Priority Data

Jun. 17, 2016    (JP) .................. 2016-120467

(51) Int. Cl.
*G01B 9/02*    (2006.01)
(52) U.S. Cl.
CPC ............... *G01B 9/02015* (2013.01)
(58) Field of Classification Search
CPC ........... G01B 9/02034; G01B 9/02015; G01B 9/02039; G01B 11/2441
See application file for complete search history.

(56) References Cited

U.S. PATENT DOCUMENTS

| 2003/0151823 | A1  | 8/2003 | Okabe |
| 2011/0007323 | A1* | 1/2011 | De Groot ............... G02B 21/14 356/519 |
| 2011/0222069 | A1  | 9/2011 | Nagahama et al. |
| 2014/0268173 | A1* | 9/2014 | Uemura ............. G01B 11/2441 356/511 |

FOREIGN PATENT DOCUMENTS

| JP | 2003-232999 | 8/2003 |
| JP | 2011-191118 | 9/2011 |

* cited by examiner

*Primary Examiner* — Jonathan Hansen
(74) *Attorney, Agent, or Firm* — Rankin, Hill & Clark LLP

(57) ABSTRACT

The present invention provides an interference measuring device with an optical system that can receive light reflected from a measurement object of a surface profile that is not perpendicular to an optical axis. An interference measuring device includes a light source for emitting light and an interferometric objective lens. The interferometric objective lens includes a reference mirror disposed in a reference beam path and a beam splitter that splits the incident light into a beam traveling along the reference beam path and a beam traveling along a measurement beam path. The beam splitter also combines the beam reflected off the reference mirror with the beam reflected off a measurement object disposed in the measurement beam path before emitting the combined beams. The interference measuring device further includes an imaging unit for taking an image of the combined beams forming on the unit and an aperture stop disposed in an optical path linking the interferometric objective lens, the light source, and the imaging unit together. The aperture stop is movable along an optical axis of the interferometric objective lens.

11 Claims, 8 Drawing Sheets

INTERFERENCE MEASURING DEVICE AND METHOD OF MEASUREMENT USING THE SAME DEVICE

CROSS-REFERENCE TO RELATED APPLICATION

This non-provisional application claims priority under 35 U.S.C. § 119(a) from Japanese Patent Application No. 2016-120467, filed on Jun. 17, 2016, the entire contents of which are incorporated herein by reference.

BACKGROUND

Technical Field

The present invention relates to an interference measuring device that measures a shape of a measurement object by using information on the brightness of interference fringes generated by optical interference. The invention also relates to a method of measurement using the same device.

Background Art

It is conventionally known that interference measuring devices such as three-dimensional profiling devices precisely measure the three-dimensional shapes of measurement objects, for example, by using information on the brightness of interference fringes generated by optical interference. These interference measuring devices employ a widely-known method in which a wide-band light source (e.g. white light) is used, as is disclosed in JP 2011-191118 A. Interference measuring devices that use white light in their light source are capable of measuring microscopic shapes with nanometer-order resolution, and are utilized for purposes such as measurement of width, height and other shapes and inspection of surface properties in semiconductor and many other industries.

FIG. 6 is a schematic view illustrating a basic configuration of an interference measuring device 1 equipped with a Michelson interferometric objective lens 30. Light emitted from a light source 11 is converted to a collimated beam at a collimator lens 12, and the collimated beam enters a beam splitter 20 in a direction perpendicular to an optical axis of the interferometric objective lens 30. The beam splitter 20 changes the direction of the collimated beam to a direction along the optical axis of the interferometric objective lens 30 and sends the beam such that the beam enters an objective lens 31. The beam passes through the objective lens 31 and is converted into a convergent beam of light before entering a beam splitter 32. The beam splitter 32 splits the incident beam into a beam of light traveling along a reference beam path in which a reference mirror 33 is disposed and a beam of light traveling along a measurement beam path in which a measurement object W is disposed. After division, the beam of light traveling along the reference beam path converges and is reflected off the reference mirror 33 before entering the beam splitter 32 again. The beam of light traveling along the measurement beam path converges and is projected onto the measurement object W. The projected beam is reflected off the measurement object W and enters the beam splitter 32 again. The reflected beams incident on the beam splitter 32 are combined and emitted before being converted into a collimated beam at the objective lens 31. The collimated beam passes through the beam splitter 20 and enters an image-forming lens 40. The image-forming lens 40 causes the collimated beam to converge and form an interference image on imaging means 50.

In interference measuring devices that use white light in their light source, interference fringes generated by different wavelengths are superimposed and the brightness of the composite fringes peaks at a position where the reference and measurement beam paths are equal in optical path length. Thus, the white-light interference measuring device takes interference images, i.e. data about the two-dimensional distribution of optical interference intensity, through a CCD camera or any other imaging means while varying the optical length of the reference or measurement beam path. The interference measuring device detects a focused position where peak fringe contrast is found at each pixel of a measurement object in the instrument field of view in order to measure a surface height at each pixel and determine a three-dimensional profile or other shapes of the measurement object.

Many interference measuring devices use a telecentric optical system to perform batch wide-field measurement of measurement objects having differences in level, as is disclosed in JP 2003-232999 A. The telecentric optical system includes an aperture stop provided at a lens' focal point adjacent to one side of the lens to control rays of light and ensures that rays that pass through the center of the aperture stop (hereinafter referred to as "principal rays") are parallel to the optical axis at the other side of the lens. In the telecentric optical system, a measurement object having a level difference in a direction of the optical axis (a Z-axis direction) is disposed at the other side of the lens, and the optical system receives a beam of reflected light parallel to the optical axis from anywhere on the measurement object at the time of projecting light onto the measurement object. Consequently, even if the location of the measurement object changes in the Z-axis direction, the size of images in X- and Y-axis directions perpendicular to the Z-axis remains unchanged. This configuration allows the optical system to measure shapes of a measurement object in the X- and Y-axis directions perpendicular to the Z-axis with satisfactory precision even if the measurement object has a level difference.

Similarly, the interference measuring device 1 illustrated in the schematic view of FIG. 6 uses a telecentric optical system and includes an aperture stop 60 provided at a focal point of the objective lens 31 adjacent to the image-forming lens 40. Thus, the optical system receives a beam of reflected light parallel to the optical axis from anywhere on the measurement object W disposed at a side of the objective lens 31 opposite to the focal point. This configuration allows the optical system to measure shapes of the measurement object W in X- and Y-axis directions with satisfactory precision.

In the interference measuring device 1 illustrated in the schematic view of FIG. 6, a focal point of the image-forming lens 40 adjacent to the objective lens 31 coincides with the focal point of the objective lens 31 adjacent to the image-forming lens 40, and the aperture stop 60 is provided at the coinciding focal point. This configuration means that principal rays of light are parallel both to the optical axis at the objective lens 31 side adjacent to the measurement object W and to the optical axis at an image-forming lens 40 side adjacent to the imaging means 50 (double-sided telecentric). As a result, the interference measuring device 1 enables pencils of light coming from the optical system and reaching anywhere on an image surface of the imaging means 50 to be perpendicularly incident on the image surface and prevents light receiving efficiency from decreasing due to oblique incidence of a pencil of light.

SUMMARY OF THE INVENTION

Problems to be Solved by the Invention

Use of an objective lens with lower magnification enables wider-field measurement and at the same time lowers a numerical aperture (NA). As a result, a maximum tilt angle allowed for a measurement object within which the objective lens can receive reflected beams decreases.

FIGS. 7A and 7B each illustrate how incident light 81 coming through the objective lens 31 is reflected off the measurement object W and how reflected light 82, i.e. the reflected incident light, is emitted through the objective lens 31.

FIG. 7A shows a case in which an optical axis 80 of the objective lens 31 is perpendicular to a surface of the measurement object W. In this case, an optical axis of the reflected light 82 coincides with the optical axis 80 of the objective lens 31, and every beam of light coming through the objective lens 31 and being reflected off the measurement object W enters the objective lens 31 again. Meanwhile, FIG. 7B shows a case in which the measurement object W is tilted at an angle of A degrees and thus the optical axis 80 of the objective lens 31 is not perpendicular to the surface of the measurement object W. In this case, the optical axis of the reflected light 82 does not coincide with the optical axis 80 of the objective lens 31. In this situation, beams of the reflected light 82 that form an angle of θr or smaller with the optical axis 80 can only enter the objective lens 31. The remaining beams of the reflected light 82 are not able to enter the objective lens 31. If the measurement object W is tilted at an angle in excess of a maximum allowed tilt angle (a maximum tilt angle for a measurement object within which an objective lens can receive beams reflected off the tilted measurement object), the objective lens 31 cannot receive the reflected light 82 and measurement is disabled.

FIGS. 8A to 8C illustrate how reflection of incident light 81 incident on the measurement object W varies with a surface profile of the measurement object W in a telecentric optical system in which a beam of light coming through the aperture stop 60 provided at the objective lens 31 focal point adjacent to one side of the objective lens 31 and entering the one side of the objective lens 31 travels parallel with the optical axis 80 through the other side of the objective lens 31 to reach the measurement object W. FIG. 8A shows a measurement object W having a flat surface perpendicular to the optical axis 80. Reflected light 82 reflected off the measurement object W inversely follows a track of incident light 81 and enters the objective lens 31. In contrast, FIG. 8B shows a measurement object W having a convex surface. Reflected light 82 reflected off the measurement object W deviates outward from a track of incident light 81. In the case of a small radius of convex curvature and a larger tilt of the measurement object W surface than a maximum tilt angle allowed for the measurement object within which the objective lens 31 can receive reflected beams, the objective lens 31 is not able to receive the reflected light 82. FIG. 8C shows a measurement object W having a concave surface. Reflected light 82 reflected off the measurement object W deviates inward from a track of incident light 81. In the case of a small radius of concave curvature and a larger tilt of the measurement object W surface than a maximum tilt angle allowed for the measurement object within which the objective lens 31 can receive reflected beams, the objective lens 31 is not able to receive the reflected light 82.

It is an object of the present invention to provide an interference measuring device with an optical system that can receive light reflected from a measurement object of a surface profile that is not perpendicular to an optical axis. It is another object of the present invention to provide a method of measurement using the same device.

Means for Solving the Problems (1) An interference measuring device according to an aspect of the present invention includes a light source, an interferometric objective lens, imaging means, and an aperture stop. The light source emits light like white light. The interferometric objective lens includes a reference mirror disposed in a reference beam path and a beam splitter configured to split the light incident from the light source into a beam traveling along the reference beam path and a beam traveling along a measurement beam path. The beam splitter is also configured to combine the beam reflected off the reference mirror with the beam reflected off a measurement object disposed in the measurement beam path before emitting the combined beams. The combined beams emitted from the beam splitter form an image on the imaging means. The imaging means takes the formed image. The aperture stop is disposed in an optical path linking the interferometric objective lens, the light source, and the imaging means together. The aperture stop can be shifted along an optical axis of the interferometric objective lens to control a path of a light beam.

If principal rays of light are perpendicularly projected from the interferometric objective lens onto the measurement object, the interferometric objective lens can most efficiently receive the principal rays reflected off the measurement object. Thus, it is preferred that a tilt principal ray projected onto the measurement object of a convex shape come closer to the optical axis, and a tilt principal ray projected onto the measurement object of a concave shape move farther away from the optical axis, for example. According to the aspect of the present invention, if the aperture stop has been shifted from a focal point of the interferometric objective lens toward the interferometric objective lens, tilt principal rays come close to the optical axis. If the aperture stop has been shifted from the focal point of the interferometric objective lens toward the imaging means, tilt principal rays move away from the optical axis. This configuration can bring the angle of the principal ray projected onto the measurement object of a surface profile that is not perpendicular to the optical axis close to a right angle. An optical system that makes use of this advantage can more readily receive light reflected off the measurement object. In the case of the measurement object having a convex or concave surface profile, this configuration can ease restrictions on the radius of convex or concave curvature that is determined in accordance with a maximum tilt angle allowed for the measurement object within which the objective lens can receive reflected beams.

(2) The interference measuring device may be capable of either replacing the reference mirror with another reference mirror having a different shape or switching between these reference mirrors. A shift in the position of the aperture stop causes the principal ray to tilt relative to the optical axis. A tilt of the principal ray relative to the optical axis takes place at the reference beam path as well as the measurement beam path. If a tilt principal ray is incident on a flat reference mirror, the ray is reflected in a direction different from the direction of incident of the ray and the objective lens cannot efficiently receive the reflected ray. If an angle that the reference mirror forms with a surface perpendicular to a direction of incidence of the principal ray is wider than a maximum tilt angle allowed for the measurement object within which the objective lens can receive reflected beams, the objective lens cannot receive the ray reflected from the reference mirror. An objective lens can efficiently receive rays reflected off a reference mirror if the interference measuring device is capable of either replacing the reference mirror with another reference mirror having a different shape or switching between these reference mirrors depending on the position of the aperture stop, wherein each of the reference mirrors has a surface profile for reception of a projected principal ray at an angle close to a right angle.

(3) In the case of a convex measurement object, it is preferred that the aperture stop be shifted from the interferometric objective lens' focal point adjacent to the imaging means toward the imaging means, and a convex reference mirror be used. This configuration enables control such that the principal ray is projected onto each of the measurement object and the reference mirror as nearly perpendicular as possible. As a result, the objective lens can efficiently receive the ray reflected from each of the measurement object and the reference mirror.

(4) In the case of a concave measurement object, it is preferred that the aperture stop be shifted from the interferometric objective lens' focal point adjacent to the imaging means toward the interferometric objective lens, and a concave reference mirror be used. This configuration enables control such that the principal ray is projected onto each of the measurement object and the reference mirror as nearly perpendicular as possible. As a result, the objective lens can efficiently receive the ray reflected from each of the measurement object and the reference mirror.

(5) Preferably, an image-forming lens having a focal point movable to a location of the aperture stop should be provided in an optical path between the aperture stop and the imaging means. Disposition of the focal point of the image-forming lens at the aperture stop ensures a telecentricity between the image-forming lens and the imaging means. This configuration enables pencils of light reaching anywhere on an image surface of the imaging means to be perpendicularly incident on the image surface and thus prevents light receiving efficiency from decreasing due to oblique incidence of a pencil of light.

(6) Preferably, a collimator lens having a focal point movable to a location of the aperture stop should be provided in an optical path between the light source and the aperture stop. Disposition of the focal point of the collimator lens at the aperture stop prevents the amount of light projected onto the measurement object from decreasing due to a shift of the aperture stop.

(7) The interferometric objective lens may be any one of Michelson-, Mirau-, and Linnik-type objective lenses, for example.

(8) A method of measurement by optical interference according to an aspect of the present invention uses an interference measuring device. The interference measuring device includes a light source and an interferometric objective lens that is configured to split incident light into a beam traveling along a reference beam path and a beam traveling along a measurement beam path and that is configured to combine the beam reflected off a reference mirror disposed in the reference beam path with the beam reflected off a measurement object disposed in the measurement beam path before emitting the combined beams. The interference measuring device further includes imaging means for taking an image of the combined beams forming thereon and an aperture stop disposed in an optical path linking the interferometric objective lens, the light source, and the imaging means together, wherein the aperture stop is movable along an optical axis of the interferometric objective lens. The method includes shifting the aperture stop from a focal point of the interferometric objective lens toward the imaging means to measure the measurement object having a convex shape, wherein the focal point is adjacent to the imaging means. The method further includes shifting the aperture stop from the focal point of the interferometric objective lens toward the interferometric objective lens to measure the measurement object having a concave shape.

If principal rays of light are perpendicularly projected from the interferometric objective lens onto the measurement object, the interferometric objective lens can most efficiently receive the principal rays reflected off the measurement object. Thus, it is preferred that a tilt principal ray projected onto the measurement object of a convex shape proceed inward relative to the optical axis, and a tilt principal ray projected onto the measurement object of a concave shape proceed outward relative to the optical axis. According to the aspect of the present invention, if the aperture stop has been shifted from a focal point of the interferometric objective lens toward the imaging means, principal rays projected toward the measurement object deviate inward. If the aperture stop has been shifted from the focal point of the interferometric objective lens toward the interferometric objective lens, principal rays projected toward the measurement object deviate outward. This configuration can bring the angle of the principal ray projected onto the measurement object of a surface profile that is not perpendicular to the optical axis close to a right angle. An optical system that makes use of this advantage can more readily receive light reflected off the measurement object. In the case of the measurement object having a convex or concave surface profile, this configuration can ease restrictions on the radius of convex or concave curvature that is determined in accordance with a maximum tilt angle allowed for the measurement object within which the objective lens can receive reflected beams.

(9) Preferably, a convex reference mirror should be used to measure a convex measurement object and a concave reference mirror should be used to measure a concave measurement object. This configuration enables control such that the principal ray is projected onto each of the measurement object and the reference mirror as nearly perpendicular as possible. As a result, the objective lens can efficiently receive the ray reflected from each of the measurement object and the reference mirror.

(10) Preferably, a focal point of an image-forming lens provided in an optical path between the aperture stop and the imaging means should be located at the aperture stop to take measurement. Disposition of the focal point of the image-forming lens at the aperture stop ensures a telecentricity between the image-forming lens and the imaging means. This configuration enables pencils of light reaching anywhere on an image surface of the imaging means to be perpendicularly incident on the image surface and thus prevents light receiving efficiency from decreasing due to oblique incidence of a pencil of light.

(11) Preferably, a focal point of a collimator lens provided in an optical path between the light source and the aperture stop should be located at the aperture stop to take measurement. Disposition of the focal point of the collimator lens at the aperture stop prevents the amount of light projected onto the measurement object from decreasing due to a shift of the aperture stop.

DETAILED DESCRIPTION OF THE EMBODIMENTS

Figure 1:
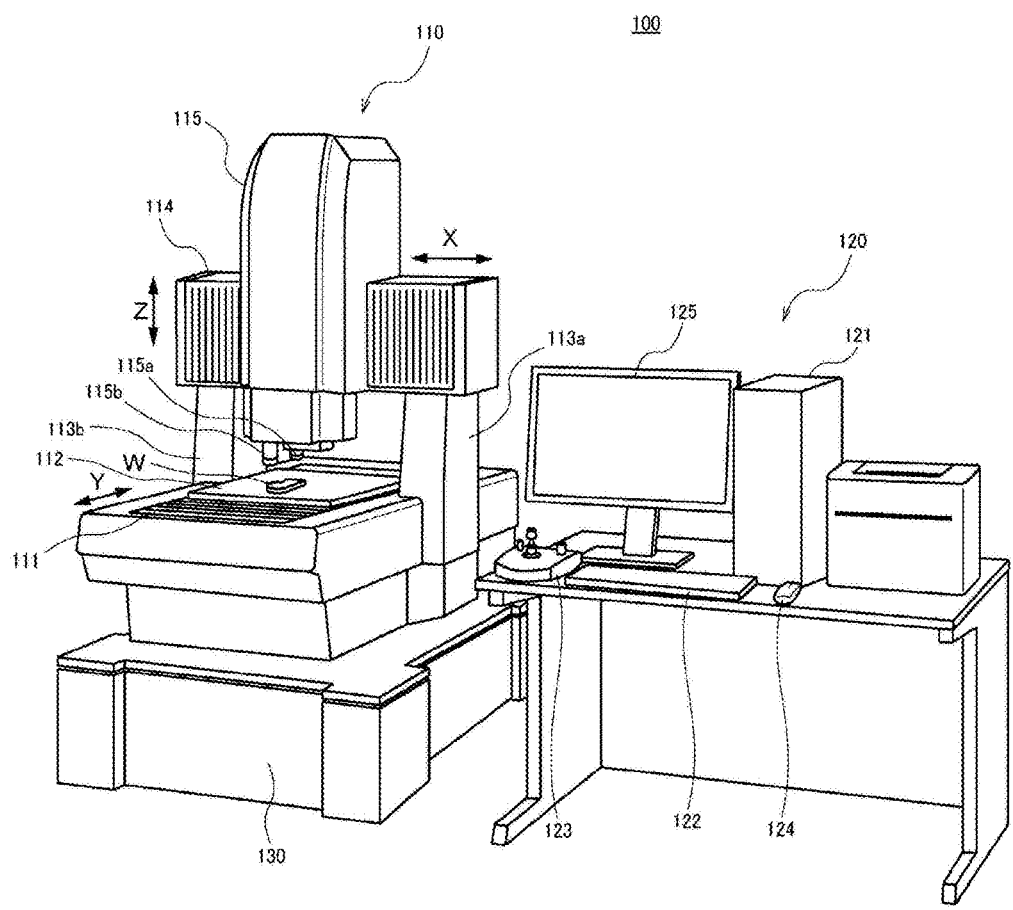
FIG. 1 is a perspective view showing an example configuration of an entire measurement apparatus including an interference measuring device according to an embodiment of the present invention.

A measurement apparatus 100 including an interference measuring device according to an embodiment of the present invention will now be described with reference to the attached drawings. In this specification and the attached drawings, elements identical to those of the already-described drawings are assigned with the same reference numerals, and their redundant descriptions are omitted.

FIG. 1 is a perspective view showing a configuration of the entire measurement apparatus 100. The measurement apparatus 100 includes a non-contact image measuring instrument 110 and a computer system 120 for driving and controlling the image measuring instrument 110 and for performing necessary data processing. The measurement apparatus 100 may further include devices such as a printer for printing measurement results and other data as appropriate.

The image measuring instrument 110 includes a stand 111, a sample stage (stage) 112, support arms 113a and 113b, an X-axis guide bar 114, and an imaging unit 115. With reference to FIG. 1, the image measuring instrument 110 is disposed on a vibration isolation table 130 installed on a floor. The vibration isolation table 130 prevents the transmission of vibrations from a floor to a measurement apparatus on the base. The vibration isolation table 130 is either an active- or a passive-type base. The stand 111 is disposed on a top board of the vibration isolation table 130. The stage 112 for placement of a measurement object W is disposed on the stand 111 such that a base surface, i.e. a top face of the stage 112, is parallel to a horizontal plane. The stage 112 is driven along a Y-axis by a Y-axis drive mechanism (not shown). Thus, the measurement object W is movable relative to the imaging unit 115 along the Y-axis. The support arms 113a and 113b are fixed to middle sections of both sides of the stand 111 and extend upward. The X-axis guide bar 114 is fixed to the support arms 113a and 113b such that both upper ends of the arms 113a and 113b are coupled through the X-axis guide bar 114. The X-axis guide bar 114 supports the imaging unit 115. The imaging unit 115 is driven along the X-axis guide bar 114 by an X-axis drive mechanism (not shown).

The imaging unit 115 includes an optical head 115a to image a two-dimensional image of the measurement object W and an interferometric optical head 115b, that is an interference measuring device according to the embodiment of the present invention, to measure a three-dimensional shape of the measurement object W via optical interference. Using either of the two detachable heads, the imaging unit 115 measures the measurement object W at a location specified by the computer system 120. The imaging unit 115 further includes interferometric optical head driving means (not shown) that moves the interferometric optical head 115b along an optical axis, i.e. a Z-axis, upon receiving a move command from the computer system 120.

The optical head 115a has a wider field of view than the interferometric optical head 115b under normal conditions. The computer system 120 controls switching between the two heads. The optical head 115a and the interferometric optical head 115b are supported by a common support plate such that a positional relationship between the two heads stays constant. Calibration is performed in advance to ensure no change in coordinate axis for measurement before and after switching.

The optical head 115a includes a CCD camera, an illuminator, and a focusing mechanism and takes a two-dimensional image of the measurement object W. Data on taken two-dimensional images are captured into the computer system 120.

Figure 2:
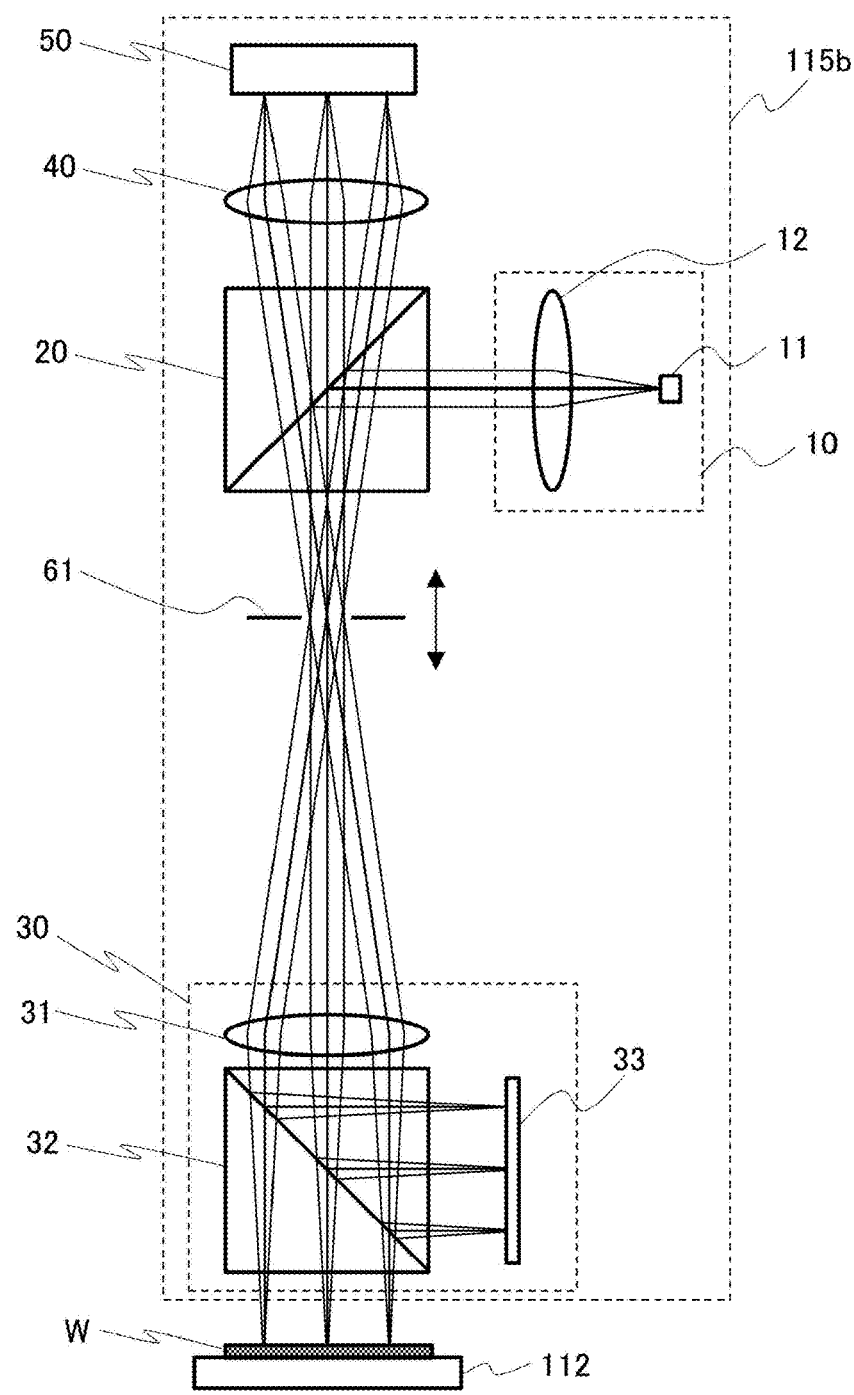
FIG. 2 is a schematic view showing a configuration of the interference measuring device including an optical path according to the embodiment of the present invention.

FIG. 2 is a schematic view showing a configuration of the interferometric optical head 115b including an optical path. As shown in FIG. 2, the interferometric optical head 115b includes a lighting unit 10, a beam splitter 20, an interferometric objective lens 30, an image-forming lens 40, imaging means 50, and an aperture stop 61. In the embodiment described herein, the interferometric objective lens 30 is compatible with the Michelson interferometer principle. Other embodiments using Mirau- or Linnik-type objective lenses can produce similar effects based on similar principles.

The lighting unit 10 includes a light source 11 and a collimator lens 12. The light source 11 is a wide-band light source that emits light having a low degree of coherence and numerous wavelength components over a wide range of frequencies. The light source 11 is a halogen lamp, a light-emitting diode (LED) lamp, or any other white light source, for example. The collimator lens 12 collimates light incident from the light source 11 and projects a collimated light beam onto the beam splitter 20. The beam splitter 20 receives the collimated beam projected from the lighting unit 10 in a direction perpendicular to an optical axis of the interferometric objective lens 30 (an objective lens 31) and redirects the collimated beam toward the interferometric objective lens 30 before sending the beam. The interferometric objective lens 30 includes the objective lens 31, a beam splitter 32, and a reference mirror 33. The collimated beam incident from the beam splitter 20 on the objective lens 31 is converted into a convergent beam. The beam splitter 32 splits the convergent beam into a beam of light traveling along a reference beam path and a beam of light traveling along a measurement beam path. The beam of light traveling along the reference beam path converges and is reflected off the reference mirror 33. The reflected beam diverges and enters the beam splitter 32 again. The beam of light traveling along the measurement beam path converges and is projected onto the measurement object W. The projected beam reflected off the measurement object W diverges and enters the beam splitter 32 again. The reflected beams incident on the beam splitter 32 are combined and emitted before being converted into a collimated beam at the objective lens 31. The collimated beam passes through the beam splitter 20 and enters an image-forming lens 40. The image-forming lens 40 causes the combined light (the beam reflected off the measurement object W and the beam reflected off the reference mirror 33) to converge and form an interference image on the imaging means 50. The imaging means 50 is an imaging device such as a CCD camera made from a two-dimensional image sensor and takes an interference image of the combined light. Data on the taken image is captured into the computer system 120. The aperture stop 61 is provided in an optical path linking the interferometric objective lens 30, the lighting unit 10, and the image-forming lens 40 together and is movable along the optical axis of the interferometric objective lens 30. The aperture stop 61 is shifted by an aperture stop driving means (not shown) under the control of the computer system 120, for example.

Figure 3A:
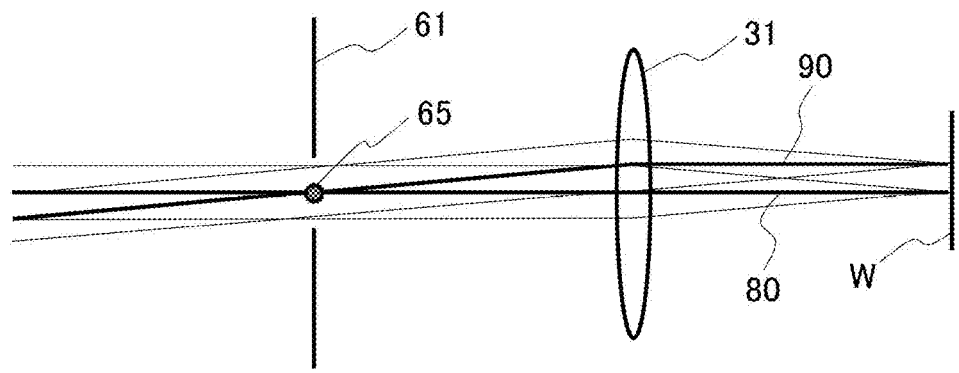
FIGS. 3A to 3C illustrate how to control a direction of principal rays by moving an aperture stop along an optical axis.
Figure 3B:
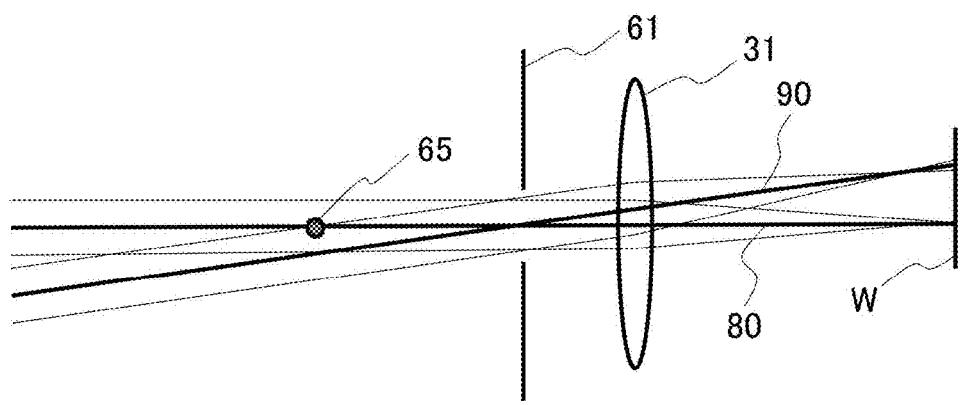
Figure 3C:
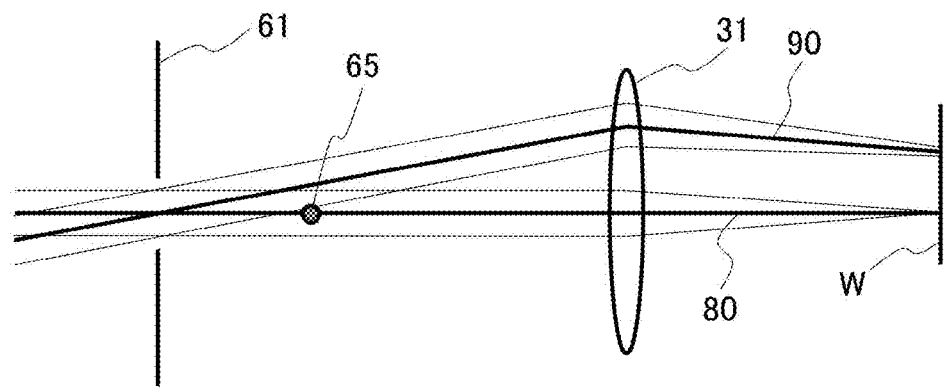

FIGS. 3A to 3C illustrate how to control a direction of principal rays (rays that pass through the center of the aperture stop 61) by moving the aperture stop 61 along an optical axis 80. FIG. 3A shows a case in which the aperture stop 61 is provided at a first focal point 65 of the objective lens 31. This case indicates a telecentric optical system in which a principal ray 90 passing through the objective lens 31 is parallel to the optical axis 80. In contrast, FIG. 3B shows a case in which the aperture stop 61 has been shifted from the focal point 65 toward the objective lens 31. The tilt principal ray 90 passing through the objective lens 31 comes closer to the optical axis 80 with a decrease in distance between the aperture stop 61 and the objective lens 31. FIG. 3C shows a case in which the aperture stop 61 has been shifted from the focal point 65 toward the imaging means 50. The tilt principal ray 90 passing through the objective lens 31 moves farther away from the optical axis 80 with a decrease in distance between the aperture stop 61 and the imaging means 50.

Optical systems have the characteristic as described above, and an optical system that makes use of the characteristic can more readily receive light reflected off a measurement object W surface profile that is not perpendicular to an optical axis. The angle of a principal ray projected onto a measurement object W can be brought close to a right angle by shifting an aperture stop and controlling the direction of the principal ray. An interferometric objective lens can most efficiently receive light reflected off a measurement object if a principal ray is perpendicularly projected from the interferometric objective lens onto the measurement object.

Figure 4A:
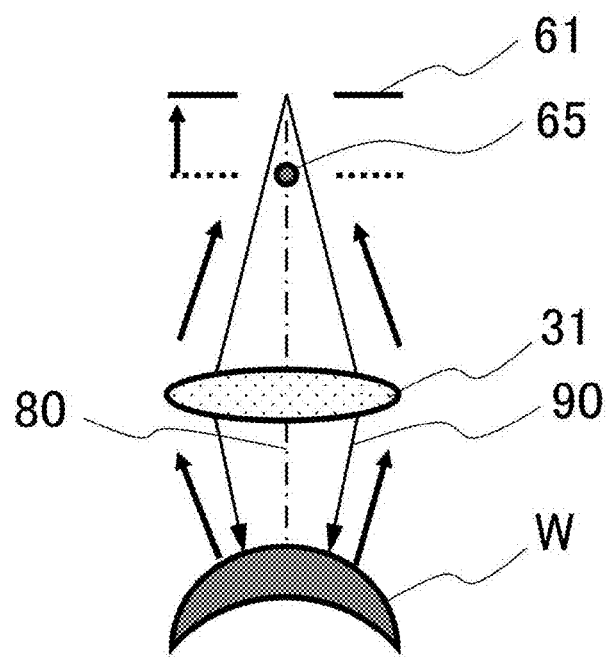
FIGS. 4A and 4B are example drawings each illustrating how to control the direction of principal rays by moving the aperture stop along the optical axis.

For example, in the case of the measurement object W having a convex or concave surface profile, this embodiment can ease restrictions on the radius of convex or concave curvature that is determined in accordance with a maximum tilt angle allowed for the measurement object W within which the objective lens 31 can receive reflected beams. If the measurement object W has a convex surface profile, light reflected perpendicularly off the surface of the measurement object W deviates outward with respect to the optical axis 80. Thus, the principal ray 90 is projected onto the measurement object W at an angle close to a right angle so long as the direction of the principal ray 90 is controlled such that the principal ray 90 comes close to the optical axis 80. In other words, as shown in FIG. 4A, this is achieved if the aperture stop 61 is shifted from the focal point 65 toward the imaging means 50. This shift can bring the angle of the principal ray 90 projected onto the measurement object W close to a right angle.

Figure 4B:
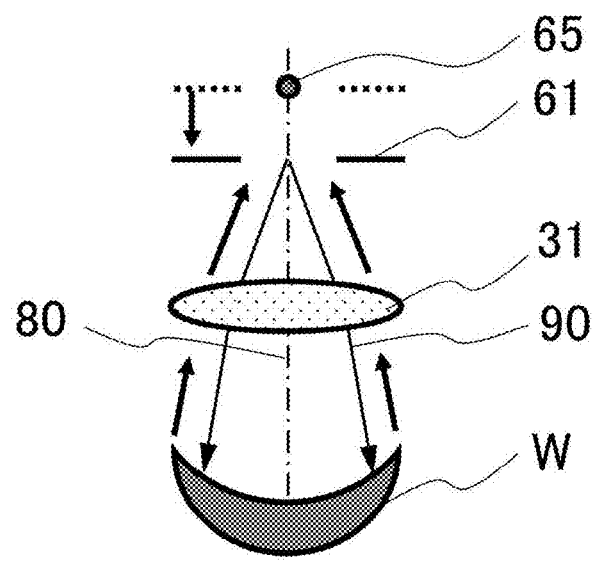

Consequently, this embodiment enables the objective lens 31 to receive light reflected off a measurement object having a smaller radius of convex curvature as compared with cases where the direction of a principal ray 90 is not controlled. If the measurement object W has a concave surface profile, light reflected perpendicularly off the surface of the measurement object W deviates inward toward the optical axis 80. Thus, the principal ray 90 is projected onto the measurement object W at an angle close to a right angle so long as the direction of the principal ray 90 is controlled such that the principal ray 90 moves away from the optical axis 80. In other words, as shown in FIG. 4B, this is achieved if the aperture stop 61 is shifted from the focal point 65 toward the objective lens 31. This shift can bring the angle of the principal ray 90 projected onto the measurement object W close to a right angle. Consequently, this embodiment enables the objective lens 31 to receive light reflected off a measurement object having a smaller radius of concave curvature as compared with cases where the direction of a principal ray 90 is not controlled.

A shift in the position of the aperture stop 61 causes the principal ray 90 to tilt relative to the optical axis 80. A tilt of the principal ray 90 relative to the optical axis 80 takes place at the reference beam path as well as the measurement beam path. If a tilt principal ray 90 is incident on a flat reference mirror 33, the ray is reflected in a direction different from the direction of incident of the ray and the objective lens 31 cannot efficiently receive the reflected ray. Especially if an angle that the reference mirror 33 forms with a surface perpendicular to a direction of incidence of the principal ray 90 is wider than a maximum tilt angle allowed for the measurement object W within which the objective lens 31 can receive reflected beams, the objective lens 31 cannot receive the ray reflected from the reference mirror 33. An objective lens can efficiently receive rays reflected off a reference mirror if the interference measuring device is capable of either replacing the reference mirror with another reference mirror having a different shape or switching between these reference mirrors depending on the position of the aperture stop, wherein each of the reference mirrors has a surface profile for reception of a projected principal ray at an angle close to a right angle. A configuration that enables this switching may have reference mirrors suitable for respective predetermined aperture stop position ranges and switch between the reference mirrors in conjunction with predetermined aperture stop positions, for example.

The position of an aperture stop is determined depending on the surface profile of a measurement object. After that, a surface profile preferable for a reference mirror is determined. In other words, since the position of the aperture stop is determined such that a principal ray is projected onto the measurement object as nearly perpendicular as possible, the reference mirror should have a surface profile close to the surface profile of the measurement object such that the principal ray is projected onto the reference mirror as nearly perpendicular as possible. As a result, an objective lens can efficiently receive the ray reflected from the reference mirror. For example, in the case of a convex measurement object, it is preferred that the aperture stop be shifted from the interferometric objective lens' focal point adjacent to the imaging means toward the imaging means, and a convex reference mirror be used. In the case of a concave measurement object, it is preferred that the aperture stop be shifted from the interferometric objective lens' focal point adjacent to the imaging means toward the interferometric objective lens, and a concave reference mirror be used.

Disposition of the aperture stop 61 at a focal point of the image-forming lens 40 ensures a telecentricity between the image-forming lens 40 and the imaging means 50. This configuration enables pencils of light reaching anywhere on an image surface of the imaging means 50 to be perpendicularly incident on the image surface and thus prevents light receiving efficiency from decreasing due to oblique incidence of a pencil of light. However, the position of the aperture stop 61 deviates from the focal point of the image-forming lens 40 if the aperture stop 61 is shifted to control the direction of principal rays. To offset this disadvantage, it is preferred that the image-forming lens 40 be a zoom or varifocal lens that allows focal point adjustment, for example. This configuration enables the focal point to be shifted to the position of the aperture stop 61 in response to a shift of the aperture stop 61 and maintains a telecentricity between the image-forming lens 40 and the imaging means 50. The focal point of the image-forming lens 40 is shifted under the control of the computer system 120, for example.

Disposition of the aperture stop 61 at a focal point of the collimator lens 12 enables the interferometric objective lens 30 to most efficiently receive light from the light source 11. However, the position of the aperture stop 61 deviates from the focal point of the collimator lens 12 if the aperture stop 61 is shifted to control the direction of principal rays. Thus, it is preferred that the collimator lens 12 be a zoom or varifocal lens that allows focal point adjustment, for example. This configuration enables the focal point to be shifted to the position of the aperture stop 61 in response to a shift of the aperture stop 61 and allows light from the light source 11 to be efficiently incident on the interferometric objective lens 30. The focal point of the collimator lens 12 is shifted under the control of the computer system 120, for example.

The interferometric optical head driving means moves the interferometric optical head 115b along the optical axis, i.e. the Z-axis, during measurement to adjust a length of the measurement beam path such that the optical path length difference between the reference and measurement beam paths is zero. The length of the measurement beam path may be adjusted by shifting the stage 112. Alternatively, a length of the reference beam path may be adjusted by shifting the reference mirror 33 along the optical axis with a piezoelectric actuator (not shown) such that the optical path length difference is zero.

The interferometric optical head 115b is shifted along the optical axis by the interferometric optical head driving means under the control of the computer system 120 and scans positions along the optical axis while repeatedly imaging a measurement object through the imaging means 50. The imaging means 50 acquires interference images taken at the scanned positions. The computer system 120 captures data on these images and detects a scanned position where peak fringe contrast is found at each pixel in the instrument field of view in order to determine a height (a level in the Z-axis direction) at each pixel of a measured surface of the measurement object W.

The computer system 120 includes a main computer unit 121, a keyboard 122, a joystick box (hereafter called a J/S) 123, a mouse 124, and a display 125.

Figure 5:
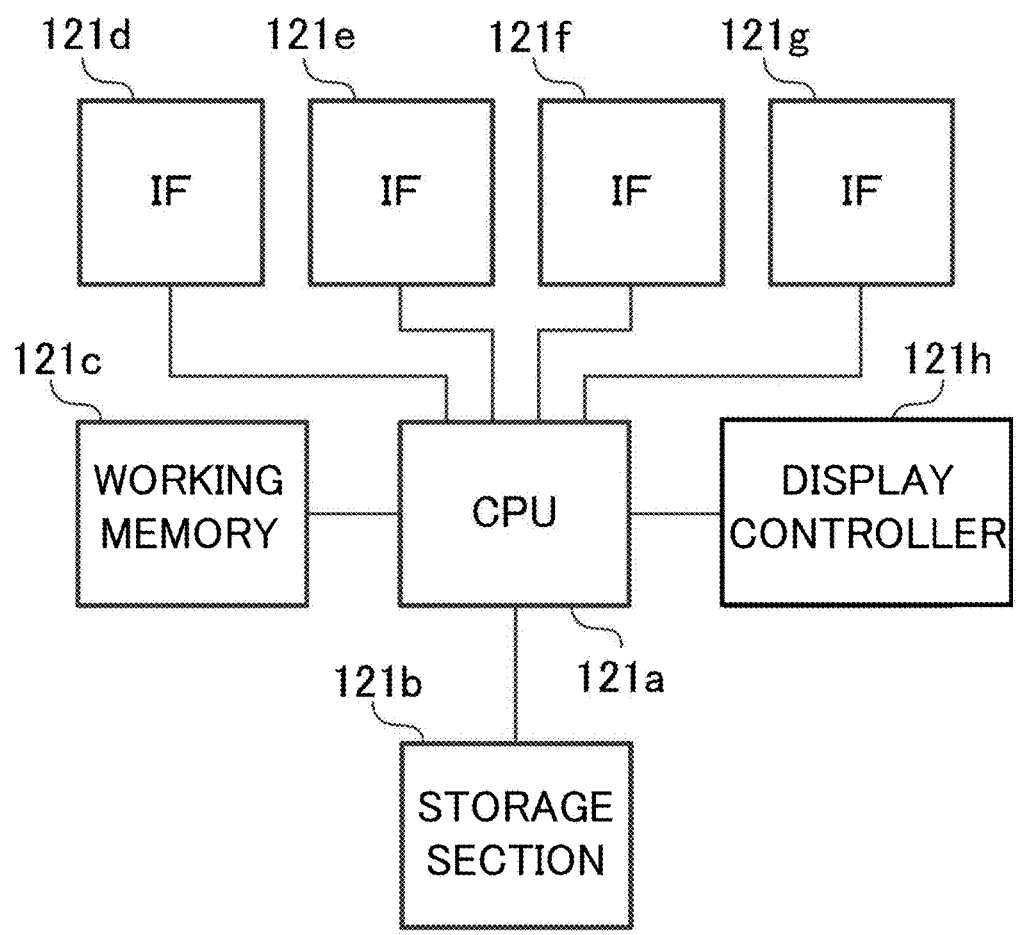
FIG. 5 is a block diagram showing a configuration of a computer system.
Figure 6:
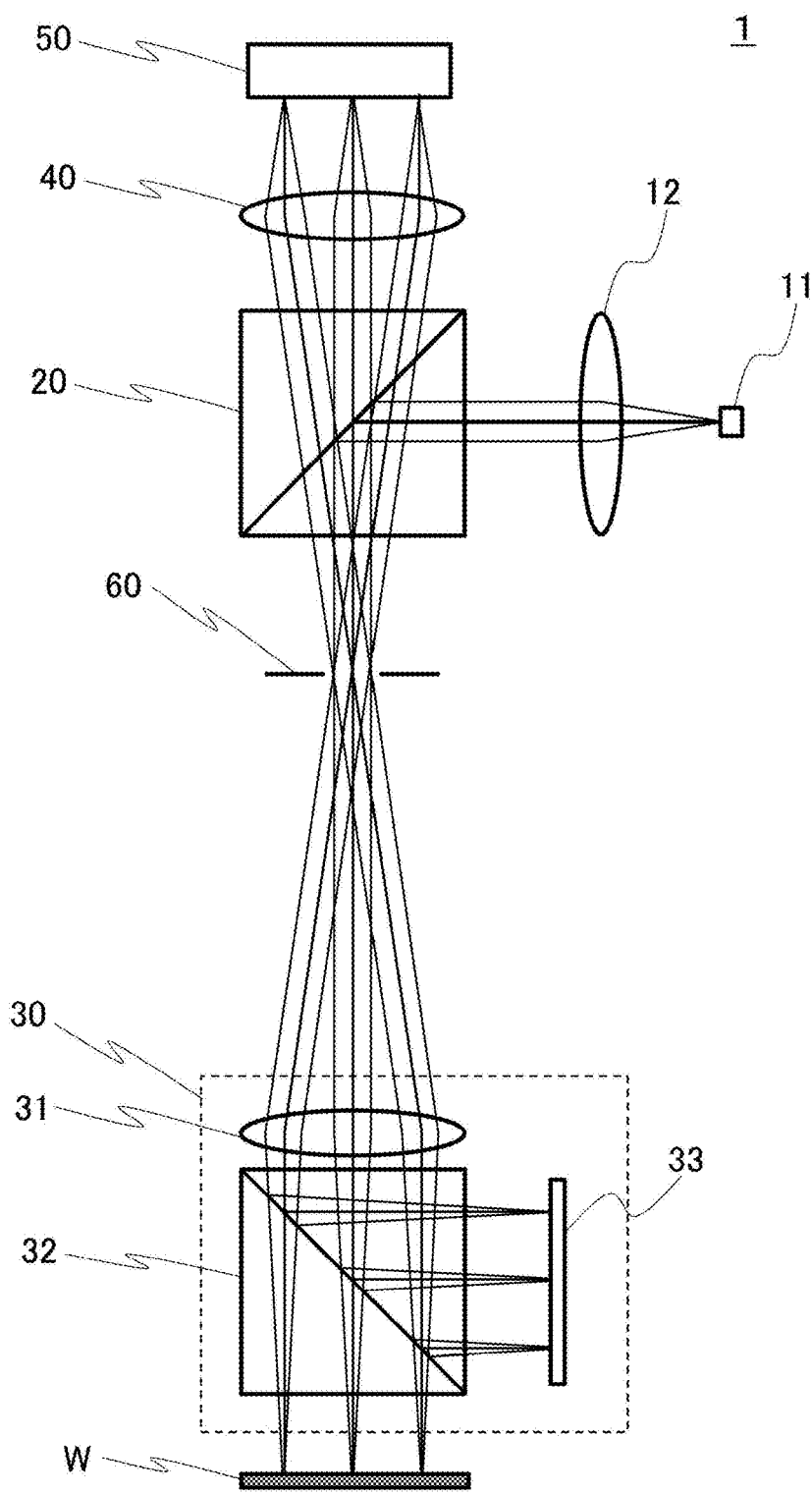
FIG. 6 is a schematic view showing a configuration of a conventional interference measuring device including an optical path.
Figure 7A:
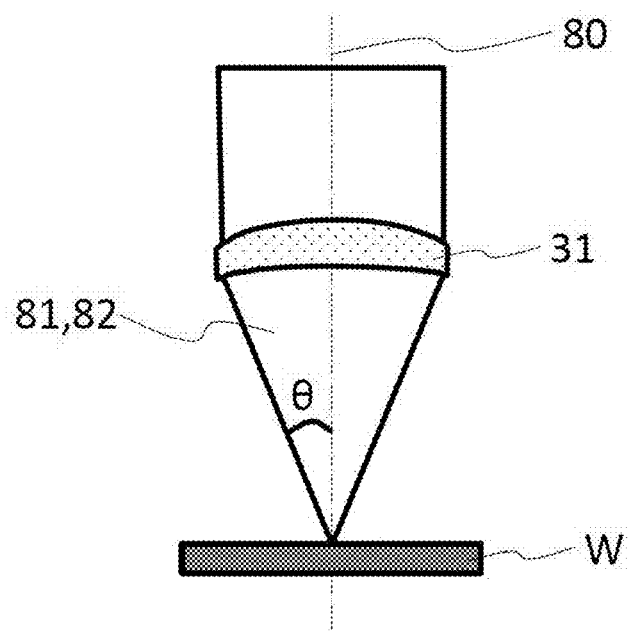
FIGS. 7A and 7B illustrate variations in the direction of reflected light depending on a tilt of a measurement object.
Figure 7B:
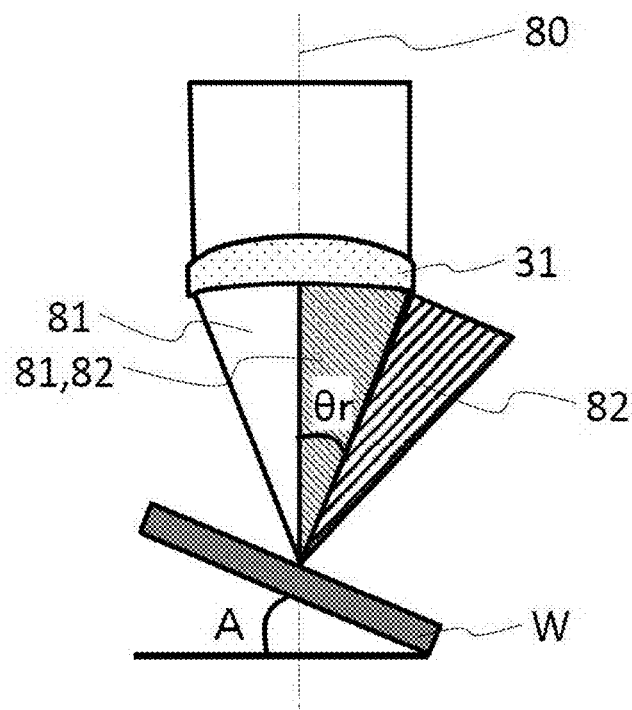
Figure 8A:
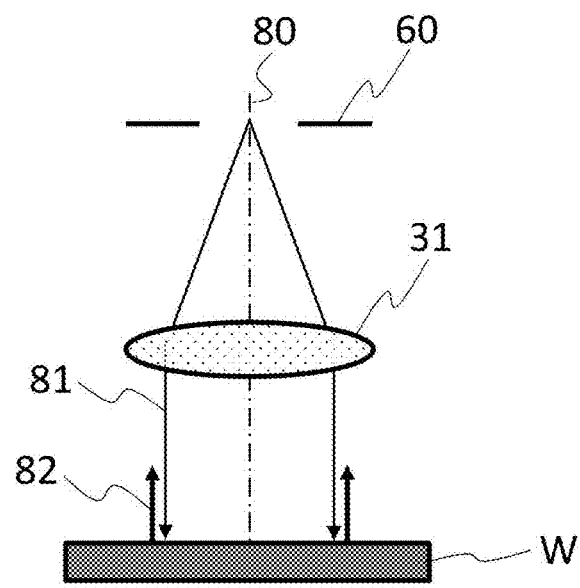
FIGS. 8A to 8C illustrate variations in the direction of reflected light depending on the shape of a measurement object.
Figure 8B:
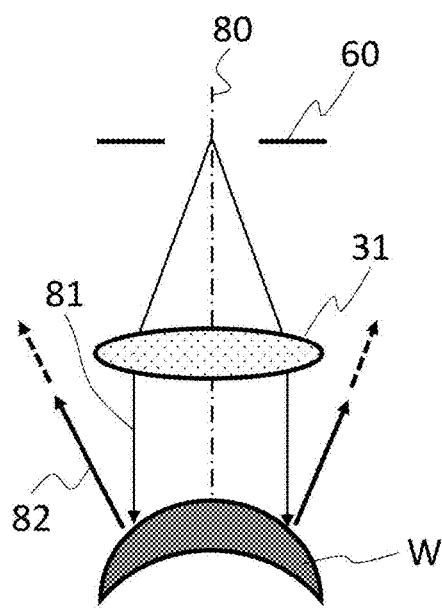
Figure 8C:
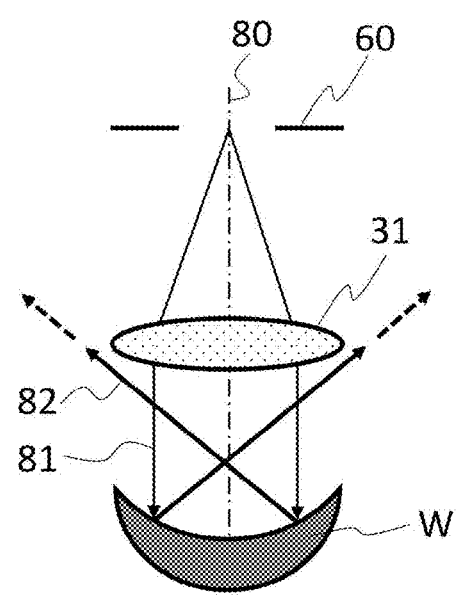

With reference to FIG. 5, the main computer unit 121 includes a CPU 121a, i.e. a central control part, a storage section 121b, working memory 121c, interfaces 121d, 121e, 121f, and 121g, and a display controller 121h for the display 125.

Commands and data entered with the keyboard 122, the J/S 123, or the mouse 124 by an operator are put into the CPU 121a via the interface 121d. The interface 121e is connected to the measuring instrument 110, and control signals are sent from the CPU 121a to the measuring instrument 110 via the interface 121e. Various status data and measured results sent from the measuring instrument 110 are put into the CPU 121a via the interface 121e.

If an image measuring mode is selected, the display controller 121h receives image signals from the CCD camera of the optical head 115a and displays an image converted from the signals on the display 125. If an interferometric measurement mode is selected, the display controller 121h displays an image taken with the interferometric optical head 115b, CAD data, data on a three-dimensional profile measured with the interferometric optical head 115b, or other data as appropriate on the display 125 under control from the CPU 121a. Results of measurement taken with the optical head 115a or the interferometric optical head 115b can be outputted to a printer via the interface 121f. If an external device like a CAD system (not shown) provides CAD data (design data) about a measurement object W, the data is converted into a predetermined format and put into the computer system 120 via the interface 121g.

The working memory 121c provides a work area for the CPU 121a to execute various processes. The storage section 121b is made up of a hard disk drive and RAM, for example, and stores programs executed by the CPU 121a, results of measurement taken by the measuring instrument 110, and other data.

The CPU 121a executes various processes in accordance with instructions such as various data input via the interfaces, operator commands, and programs stored on the storage section 121b. These processes include switching between the mode of image measurement with the optical head 115a and the mode of interferometric measurement with the interferometric optical head 115b, specifying measurement ranges, shifting the aperture stop 61, shifting the focal points of the collimator lens 12 and the image-forming lens 40, moving the imaging unit 115 along the X-axis, moving the stage 112 along the Y-axis, imaging two-dimensional images with the optical head 115a, and measuring interference images and computing three-dimensional profile data with the interferometric optical head 115b.

Some structural elements or functions of an interference measuring device in accordance with the present invention may be combined with each other, or may be divided as appropriate. The scope of the present invention should include various modifications and variations of the embodiment shown in the preceding detailed description without deviating from the gist of the present invention.

If a method of measurement by optical interference in accordance with the present invention is implemented through a computer, procedures for implementing the method are expressed in programs. These programs are stored on a hard disk drive, for example. Necessary programs and data are loaded into random access memory (RAM), and the CPU on the computer executes the programs to perform the respective procedures.

What is claimed is:

1. An interference measuring device comprising:
a light source for emitting light;
an interferometric objective lens comprising:

a reference mirror disposed in a reference beam path; and a beam splitter being configured to split the incident light into a beam traveling along the reference beam path and a beam traveling along a measurement beam path and being configured to combine the beam reflected off the reference mirror with the beam reflected off a measurement object disposed in the measurement beam path before emitting the combined beams;

imaging means for taking an image of the combined beams forming thereon; and an aperture stop disposed in an optical path linking the interferometric objective lens, the light source, and the imaging means together, the aperture stop being movable along an optical axis of the interferometric objective lens.

2. The interference measuring device according to claim 1, being capable of either replacing the reference mirror with another reference mirror having a different shape or switching between the reference mirrors.

3. The interference measuring device according to claim 1, wherein the aperture stop is spaced from a focal point of the interferometric objective lens toward the imaging means, the focal point being adjacent to the imaging means, and wherein the reference mirror is a convex mirror.

4. The interference measuring device according to claim 1, wherein the aperture stop is spaced from a focal point of the interferometric objective lens toward the interferometric objective lens, the focal point being adjacent to the imaging means, and wherein the reference mirror is a concave mirror.

5. The interference measuring device according to claim 1, further comprising an image-forming lens disposed in an optical path between the aperture stop and the imaging means, wherein the image-forming lens has a focal point movable to a location of the aperture stop.

6. The interference measuring device according to claim 1, further comprising a collimator lens disposed in an optical path between the light source and the aperture stop, wherein the collimator lens has a focal point movable to a location of the aperture stop.

7. The interference measuring device according to claim 1, wherein the interferometric objective lens is any one of Michelson-, Mirau-, and Linnik-type objective lenses.

8. A method of measurement by optical interference, the method using an interference measuring device comprising:

a light source for emitting light;

an interferometric objective lens comprising:
  a reference mirror disposed in a reference beam path; and
  a beam splitter being configured to split the incident light into a beam traveling along the reference beam path and a beam traveling along a measurement beam path and being configured to combine the beam reflected off the reference mirror with the beam reflected off a measurement object disposed in the measurement beam path before emitting the combined beams;

imaging means for taking an image of the combined beams forming thereon; and an aperture stop disposed in an optical path linking the interferometric objective lens, the light source, and the imaging means together, the aperture stop being movable along an optical axis of the interferometric objective lens, wherein the method comprises shifting the aperture stop from a focal point of the interferometric objective lens toward the imaging means to measure the measurement object having a convex shape, the focal point being adjacent to the imaging means, and shifting the aperture stop from the focal point of the interferometric objective lens toward the interferometric objective lens to measure the measurement object having a concave shape.

9. The method of measurement by optical interference according to claim 8, further comprising using the reference mirror of a convex shape to measure the measurement object having a convex shape, and using the reference mirror of a concave shape to measure the measurement object having a concave shape.

10. The method of measurement by optical interference according to claim 8, further comprising shifting a focal point of an image-forming lens disposed in an optical path between the aperture stop and the imaging means to a location of the aperture stop to take measurement.

11. The method of measurement by optical interference according to claim 8, further comprising shifting a focal point of a collimator lens disposed in an optical path between the light source and the aperture stop to a location of the aperture stop to take measurement.

* * * * *